US012629853B2

(12) United States Patent
Montoya Herrera

(10) Patent No.: US 12,629,853 B2
(45) Date of Patent: May 19, 2026

(54) PRECISION SHAVING RAZOR WITH VARIABLE BLADE ANGLES

(71) Applicant: Jose Trinidad Montoya Herrera, Grand Junction, CO (US)

(72) Inventor: Jose Trinidad Montoya Herrera, Grand Junction, CO (US)

( * ) Notice: Subject to any disclaimer, the term of this patent is extended or adjusted under 35 U.S.C. 154(b) by 224 days.

(21) Appl. No.: 18/378,991

(22) Filed: Oct. 11, 2023

(65) Prior Publication Data

US 2024/0123640 A1 Apr. 18, 2024

Related U.S. Application Data

(60) Provisional application No. 63/475,071, filed on Oct. 12, 2022.

(51) Int. Cl.
*B26B 21/32* (2006.01)

(52) U.S. Cl.
CPC .................................... *B26B 21/32* (2013.01)

(58) Field of Classification Search
CPC ...................................................... B26B 21/32
See application file for complete search history.

(56) References Cited

U.S. PATENT DOCUMENTS

| | | | | |
|---|---|---|---|---|
| 512,596 A | | 1/1894 | Wolferts | |
| 775,134 A | | 11/1904 | Gillette | |
| 1,024,509 A | * | 4/1912 | Harrison | B26B 21/22 30/72 |
| 2,669,777 A | | 2/1954 | Scully | |
| 2,952,911 A | * | 9/1960 | Shnitzler | B26B 21/32 30/526 |
| 3,129,508 A | * | 4/1964 | Norman | B26B 21/185 30/73 |

(Continued)

FOREIGN PATENT DOCUMENTS

| | | |
|---|---|---|
| AU | 2015316125 C1 | 3/2016 |
| CA | 2960412 C | 3/2016 |

(Continued)

OTHER PUBLICATIONS

"Safety Razor Aggressiveness", St. James Shaving Emporium, 3 pages, online availble at <https://www.stjamesshavingemporium.co.uk/blogs/the-barbers-chair/safety-razor-aggressiveness>, Known as early as Oct. 2023.

(Continued)

*Primary Examiner* — Hwei-Siu C Payer
(74) *Attorney, Agent, or Firm* — Hall Estill Law Firm

(57) ABSTRACT

A shaving implement having a head, a blade, a support structure, and a gripping member. The blade having a first and second cutting edge deformed by a compressive force between the head and a support structure. The angle of deformation being dependent on the angular orientation of a first and second side of the head, where both angles of deformation are distinct from each other. The compression of the blade being dependent on a compression by a user who acts upon the gripping member to move the support structure towards the head until the blade is substantially clamped between the head and the support structure. When not in use, the shaving implement may be positioned upright on a base of the gripping member.

14 Claims, 6 Drawing Sheets

(56) References Cited

U.S. PATENT DOCUMENTS

| | | | | |
|---|---|---|---|---|
| 3,302,284 | A * | 2/1967 | Schrader | B26B 21/32 30/41.7 |
| 3,363,313 | A * | 1/1968 | Kuhnl | B26B 21/40 30/60.5 |
| 3,626,591 | A | 12/1971 | Robey | |
| 3,680,211 | A | 8/1972 | Keck | |
| 8,336,212 | B2 | 12/2012 | Bozikis et al. | |
| 8,359,751 | B2 | 1/2013 | Efthimiadis et al. | |
| 9,327,414 | B2 | 5/2016 | Szczepanowski et al. | |
| 9,505,142 | B2 | 11/2016 | Nordstrom | |
| D788,367 | S | 5/2017 | Nordstrom | |
| 9,840,014 | B2 | 12/2017 | Gilor | |
| 9,931,755 | B2 | 4/2018 | Gilor | |
| D832,513 | S | 10/2018 | Ackerman et al. | |
| D844,897 | S | 4/2019 | Howsam et al. | |
| 10,807,256 | B2 | 10/2020 | Nordstrom | |
| D901,775 | S | 11/2020 | Bowker et al. | |
| D901,776 | S | 11/2020 | Faktorovich | |
| D905,339 | S | 12/2020 | Roche | |
| 11,020,864 | B2 | 6/2021 | Spencer et al. | |
| D968,023 | S | 10/2022 | Muller | |
| 2009/0007443 | A1 | 1/2009 | Cuocolo, Jr. | |
| 2011/0197446 | A1 | 8/2011 | Macove | |
| 2015/0298327 | A1 | 10/2015 | Tomassetti et al. | |
| 2015/0352737 | A1 | 12/2015 | Hickam | |
| 2016/0075040 | A1 | 3/2016 | Nordstrom | |
| 2018/0161999 | A1 | 6/2018 | Depaz | |
| 2020/0361107 | A1 | 11/2020 | Park | |
| 2024/0123640 | A1 * | 4/2024 | Hickam | B26B 21/521 30/68 |

FOREIGN PATENT DOCUMENTS

| | | | |
|---|---|---|---|
| CN | 107107357 | B | 8/2017 |
| CN | 113752304 | A | 12/2021 |
| EP | 3191267 | B1 | 7/2017 |
| KR | 102036131 | B1 | 5/2017 |
| WO | 2018230767 | A1 | 12/2018 |

OTHER PUBLICATIONS

"Safety Razor Aggressiveness", BOLD Collaborator, 3 pages, online available at <https://www.classicshaving.com/blogs/news/safety-razor-aggressiveness>, Known as early as Oct. 2023.

"What is the Most Aggressive DE Razor?", Sharpologist, 6 pages, online available at <https://sharpologist.com/aggressive-razor/>, Known as early as Oct. 2023.

"Rockwell Razors 6S Double-Edge Safety Razor", 4 pages, Rockwell Razors, online available at <https://www.amazon.com/Rockwell-Razors-Adjustable-Stainless-Swedish/dp/B083RGRWKB/ref=sr_1_60?keywords=r41%2Brazor&linkCode=sl2&linkId=bb94dca8204b4ffd49b6095a00dd8605&qid=1697036519&sr=8-60&th=1>, Known as early as Oct. 2023.

"What Is The Best Mild Safety Razor?", Sharpologist, 4 pages, Sharpologist, online available at <https://sharpologist.medium.com/what-is-the-best-mild-safety-razor-c91b90febe2>, Known as early as Oct. 2023.

"RazoRock Satin SILVER HAWK Single Edge Razor—V2", 1 page, Italian Barber, online available at <https://www.italianbarber.com/products/razorock-satin-silver-single-edge-razor-v2>, Known as early as Oct. 2023.

"Crazy Double Edge Razor Shave Without The Safety Plate !! ", 1 page, Shaving With Rich—Youtube Video, available online at <https://www.youtube.com/watch?v=Dsl7nIQKCM8>, Known as early as Oct. 2023.

"BBN&Co Double Edge Straight Razor Model X Stainless Steel MIRROR Finish", 3 pages, https://www.amazon.com/-/he/MODEL-X/dp/B00RMEY94A, Known as early as Oct. 2023.

* cited by examiner

PRECISION SHAVING RAZOR WITH VARIABLE BLADE ANGLES

CLAIM OF PRIORITY UNDER 35 U.S.C. § 119

The present Application for Patent claims priority to Provisional Application No. 63/475,071 filed Oct. 12, 2022, and assigned to the assignee hereof and hereby expressly incorporated by reference herein.

FIELD OF THE DISCLOSURE

The present disclosure relates generally to shaving razors, and more specifically to a shaving razor featuring a head designed to enable adjustable shaving angles of a razor blade.

BACKGROUND

The field of personal grooming and shaving has witnessed continuous innovations and improvements over the years. Razor blades, in particular, have evolved from simple one-sided single-edge blades to sophisticated multi-blade cartridge systems, each designed to provide a close and comfortable shaving experience. Exemplary shaving implements include Gillette's U.S. Pat. No. 775,134 and Nordstrom's U.S. Pat. No. 9,505,142. These shaving implements are safety razors and feature a head, guard, and handle designed to securely hold a blade for safe facial and body hair shaving. While these tools effectively cut hair, they often lack precision. When one thinks of precise shaving, the immediate association is with straight razors, typically achievable through single-bladed hand-held razors like Wolfert's U.S. Pat. No. 512,596. Skilled artisans using such shaving implements can create masterful, precise cuts for both facial and body hair.

While it is not uncommon for patrons of barber shops to enjoy the experience of a straight razor cut, what has gradually disappeared from common shaving practices since the advent of safety razors and subsequent multi-cartridge systems, exemplified by Gillette's U.S. Pat. No. 6,276,062, is the precision associated with straight razors. This decline in precision can be attributed to the guards used in these razors. Guards, as demonstrated by Nordstrom, have become increasingly obstructive. While these guards serve the essential purpose of protecting the user, they pose challenges for artisans striving for precise cuts. Their bulkiness often obstructs the view of the blade's edge, resulting in uneven and imprecise shaving lines. Consequently, such implements are less desirable for skilled artisans and individuals seeking to carefully shape their facial and body hair for self-expression.

In response to these challenges, this disclosure introduces an innovative shaving tool that not only addresses the limitations of existing grooming equipment but also caters to the evolving preferences and needs of consumers. The embodiments presented here are grounded in the concept of combining the simplicity and precision found in a straight razor with the effectiveness of conventional safety razor systems.

Shaving holds a special place as a daily ritual for many, where the ability to navigate through contours, edges, and hard-to-reach areas carries significant importance. Therefore, this disclosure aims to provide a solution that streamlines shaving maneuvers, enhances visibility, and, consequently, enhances the precision of each shaving experience.

This holds particular value for individuals interested in creating intricate patterns or utilizing their hair for artistic expression.

By tackling the unmet needs and challenges of the personal grooming industry, this disclosure has the potential to transform the way individuals approach shaving, leading to more efficient, precise, cost-effective, and environmentally conscious grooming practices.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the invention may be characterized as a shaving implement. The shaving implement may comprise a blade comprising a first cutting edge, and a second cutting edge opposite the first; a head operatively coupled to the blade and comprising: a first side having curved edges and a first angular orientation in relation to a reference plane, and a second side having curved edges and a second angular orientation greater than the first side in relation to the reference plane; a support structure operatively coupled to the head and the blade, the support structure comprising: a first side configured to terminate a predefined distance from the first side of the head, and a second side opposite the first side and configured to terminate a predefined distance from the second side of the head, wherein the support structure contactingly engages and compresses the blade against the head; a gripping member matingly coupled to the head and comprising: a body, and a base, wherein the base is configured to support the shaving implement in a substantially vertical orientation when resting on a surface, and coupling the gripping member to the head causes the support structure to compress against the blade deforming the first cutting edge and the second cutting edge of the blade to substantially match the first angular orientation and the second angular orientation of the head respectively.

In some aspects, the first angular orientation of the shaving implement may exhibit an angle between zero (0) and ten (10) degrees with respect to the reference plane, and the second angular orientation may exhibit an angle between one (1) and forty-five (45) degrees with respect to the reference plane.

In other aspects, the first angular orientation of the shaving implement may exhibit an angle of ten (10) degrees with respect to the reference plane.

In yet other aspects, the second angular orientation of the shaving implement may exhibit an angle of no more than twenty-four (24) degrees with respect to the reference plane.

In some aspects, the first angular orientation may be substantially flat relative to the reference plane such that the first side of the head does not deform the blade when compressed by the support structure.

In other aspects, the support structure may further comprises a first edge having a first angular orientation relative to the reference plane, and a second edge having a second angular orientation relative to the reference plane.

Some aspects allow the head to further comprise at least one coupling member, and the gripping member to further comprise an aperture configured to matingly receive the coupling member.

In yet other aspects, the blade may comprise a first substantially flat, elongated planar surface comprising at least a central aperture configured to receive the coupling member of the head, the first planar surface being contactingly engaged with the head and the support structure, and the support structure comprises a second substantially flat, elongated planar surface of equal dimensions as the first elongated planar surface of the blade, the second planar surface being contactingly engaged with the blade and the gripping member.

In some aspects, the second substantially planar surface of the support structure may further comprise: a first angular deformation extending a predefined distance from the first side of the support structure and configured to abut and compress the first planar surface of the blade, and a second angular deformation extending a predefined distance from the second side of the support structure and configured to abut and compress the first planar surface of the blade.

In some aspects, a shaving implement may comprise: a blade comprising a central aperture, a first cutting edge, and a second cutting edge opposite the first; a head operatively coupled to the blade, the head comprising an elongated coupling member, a first side having curved edges and a first angular orientation exhibiting an angle of at least ten (10) degrees in relation to a reference plane, a second side having curved edges and a second angular orientation greater than the first side in relation to the reference plane, wherein the curved edges are configured to substantially expose the first cutting edge and the second cutting edge of the blade respectively; a support structure operatively coupled to the head and the blade, the support structure comprising a planar surface, a first side terminating a predefined distance from the first side of the head, and a second side opposite the first side and terminating a predefined distance from the second side of the head, wherein the support structure is configured to contactingly engage and compress the blade against the head; a gripping member matingly coupled to the head via the elongated coupling member, the gripping member comprising a body and a base, the base configured to support the shaving implement in a substantially vertical orientation when resting on a surface, wherein coupling the gripping member to the head causes the support structure to compress against the blade deforming the first cutting edge and the second cutting edge of the blade to substantially match the first angular orientation and second angular orientation of the head respectively.

In some aspects, the second angular orientation may exhibit an angle of no more than twenty-four (24) degrees with respect to the reference plane.

In other aspects, the second angular orientation may exhibit an angle of no more than forty-five (45) degrees with respect to the reference plane.

In some aspects, the head may further comprise indicators on a surface identifying the degree of angular orientation of the first side and the second side of the head.

Some aspects identify a head further comprising a plurality of fasteners, a blade further comprising a plurality of apertures configured to receive the plurality of fasteners, and a support structure further comprising a plurality of apertures configured to receive the plurality of fasteners.

In some aspects, the blade may comprise a first substantially flat, elongated planar surface comprising at least a central aperture configured to receive the coupling member of the head, the first planar surface being contactingly engaged with the head and the support structure, and the support structure may comprise a second substantially flat, elongated planar surface of equal dimensions as the first elongated planar surface of the blade, the second planar surface being contactingly engaged with the blade and the gripping member.

In some aspects, the second planar surface of the support structure may further comprise a first angular deformation extending a predefined distance from the first side of the support structure and configured to abut and compress the first planar surface of the blade, and a second angular deformation extending a predefined distance from the second side of the support structure and configured to abut and compress the first planar surface of the blade.

In some aspects, a shaving system is presented, comprising: a blade assembly including a blade with a first planar surface having a central aperture, a first cutting edge, and a second cutting edge located opposite the first; a head assembly operatively coupled to the blade assembly, the head assembly comprising an elongated coupling member, a first side featuring curved edges and a first angular orientation forming an angle of at least ten (10) degrees relative to a reference plane, a second side with curved edges and a second angular orientation greater than the first side relative to the reference plane, the curved edges are configured to substantially expose the first cutting edge and the second cutting edge of the blade, respectively; a support structure assembly operatively coupled to the head assembly and the blade assembly, the support structure assembly comprising a second planar surface, a first side terminating a predefined distance from the first side of the head assembly, and a second side opposite the first side and terminating a predefined distance from the second side of the head assembly, the support structure assembly is configured to contactingly engage and compress the blade against the head assembly; a gripping member assembly matingly coupled to the head assembly via the elongated coupling member, the gripping member assembly includes a body and a base, with the base configured to support the shaving system in a substantially vertical orientation when resting on a surface, the coupling of the gripping member assembly to the head assembly causes the support structure assembly to compress against the blade, deforming the first cutting edge and the second cutting edge of the blade to substantially match the first angular orientation and second angular orientation of the head assembly, respectively.

In some aspects, coupling the support structure assembly to the head assembly may cause a plurality of gaps to form between the first planar surface of the blade assembly and a bottom surface of the head assembly and a bottom surface of the blade assembly and the second planar surface of the support structure assembly, the plurality of gaps configured to allow flexibility of the blade assembly during operation.

In yet other aspects, coupling the support structure assembly to the head assembly may cause the first planar surface of the blade assembly to abut a bottom surface of the head assembly and a bottom surface of the blade assembly to abut the second planar surface of the support structure assembly.

In some aspects, the base of the gripping member is further configured to rotate about a second reference plane.

These and other features and advantages of the various embodiments can be understood from a review of the following detailed description and the accompanying drawings.

DETAILED DESCRIPTION

The present disclosure is generally directed to shaving razors. Various embodiments discussed in detail herein are generally directed to dual-sided shaving razors, such as but not limited to, a dual-sided shaving razor having two distinct shaving angles for more or less aggressive shaves. The systems, method and devices set forth herein are not so limited, however, as various forms of safety razors.

As explained below, certain embodiments offer a shaving implement featuring a modular head designed to reshape a razor blade by applying pressure. In these embodiments, this reshaping is accomplished by exerting force on the blade's edges through the interaction between the shaving implement's head and a support structure situated beneath it. The blade is positioned horizontally between the head and the support structure, and when force is applied through the shaving implement's handle, it undergoes deformation at predetermined angles.

The words "for example" and "exemplary" are used herein to mean "serving as an example, instance, or illustration." Any embodiment described herein as "for example" or "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1:
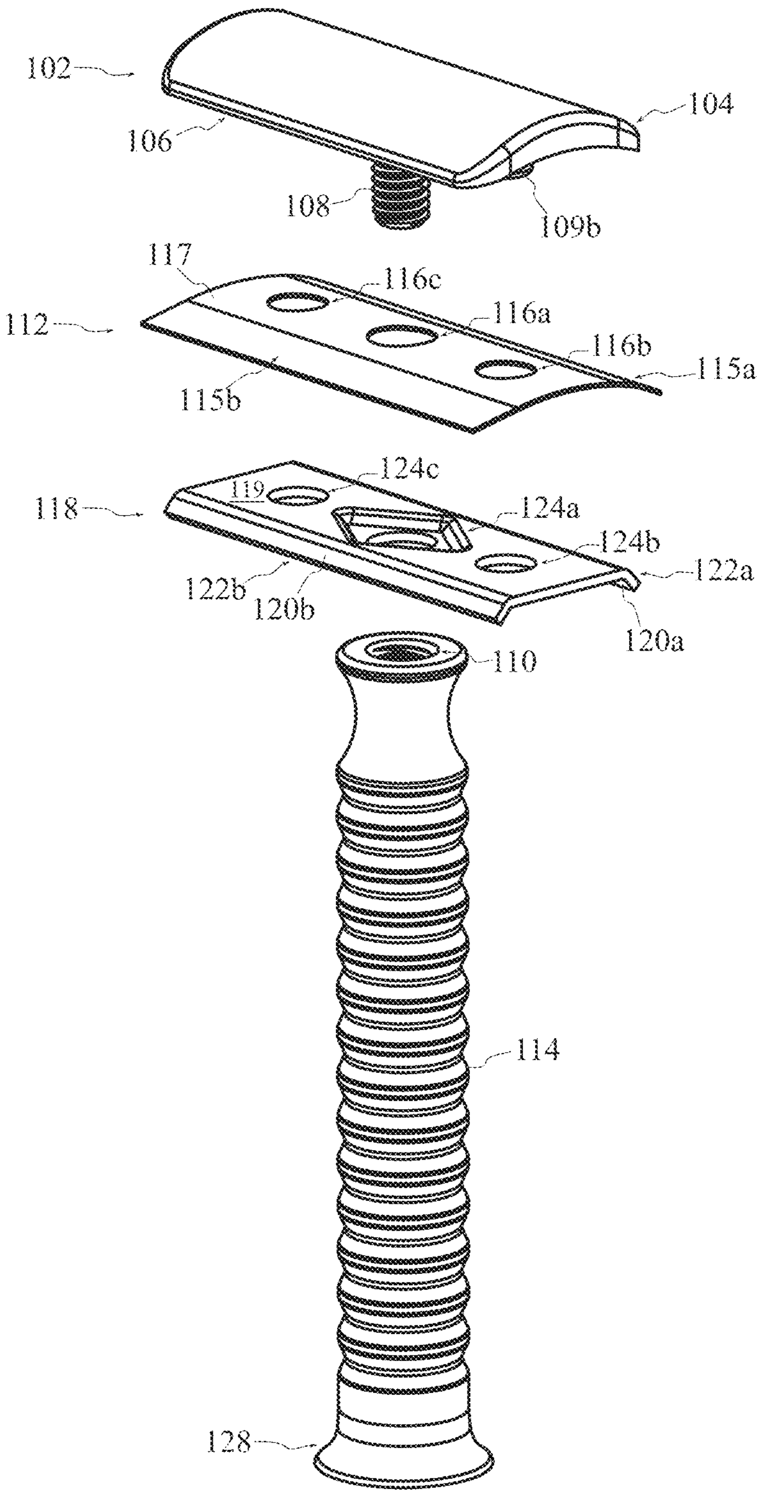
FIG. 1 is an exploded view of an embodiment of the present disclosure.
Figure 11:
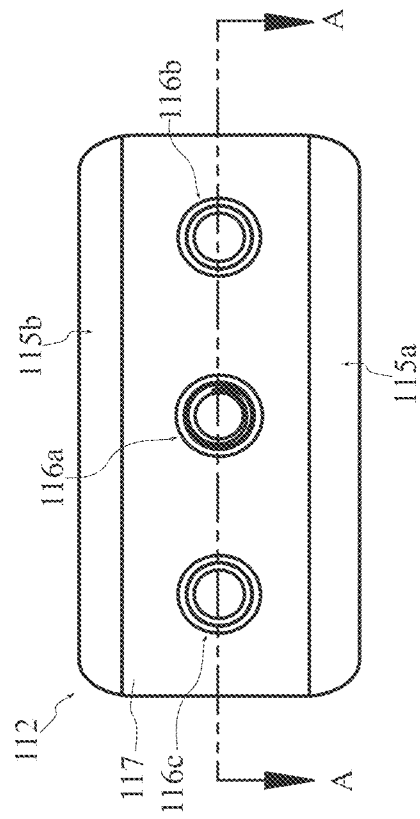
FIG. 11 is a top view of a blade according to an embodiment of the present disclosure.
Figure 10:
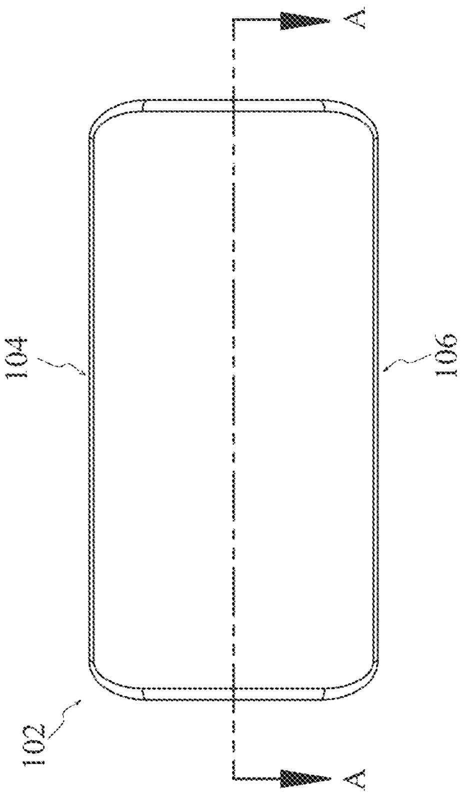
FIG. 10 is a top view of a head according to an embodiment of the present disclosure.

FIG. 1 shows a modular shaving implement 100 in an isometric exploded view. The modular shaving instrument 100 may comprise a shaving head 102, a razor blade 112, a support structure 118, and a handle 114 (also referred to herein as a "gripping member"). The head 102 may comprise one or more elongated coupling members 108 that may be configured to mate the head 102 with the gripping member 114. The elongated coupling member(s) 108 may be but are not limited to threaded fasteners. Optionally, a second **109*a* or third fastener 109*b* may be used in conjunction with or in lieu of the elongated coupling member(s) 108 for joining and/or stabilizing the head 102 with the gripping member 114. The head 102 may further comprise a first side 104 having a first angular orientation a between zero (0) degrees and thirty (30) degrees relative to a substantially horizontal reference plane A (as seen in FIGS. 10 and 11) following a first planar surface 117 of the razor blade (as seen in FIGS. 10 and 11), preferably between zero (0) and ten (10) degrees, more preferably substantially close to ten (10) degrees. The head 102 may further comprise a second side 106 having a second angular orientation β that is distinct from the first and may be between one (1) degree and forty-five (45) degrees relative to the substantially horizontal reference plane A (as seen in FIGS. 10 and 11) following the first planar surface 117 of the razor blade (as seen in FIGS. 10 and 11), preferably between twenty (20) and thirty (30) degrees, more preferably twenty-four (24) degrees. The first side 104 and second side 106** may be integral and/or contiguous and may form an edge along their common boundaries.

Additionally, the blade 112 may be operatively coupled to the head 102 through a first aperture **116*a* configured to receive the elongated coupling member 108, although other means for affixing or coupling the blade 112 to the handle 114 and the head 102 are conceivable. One such coupling means may be by the use of additional fasteners 109*a*, 109*b* and apertures 116*b*, 116*c*, or other means for coupling the blade 112 to the head 102**. The blade may also rest substantially horizontally along the reference plane A.

Figure 7:
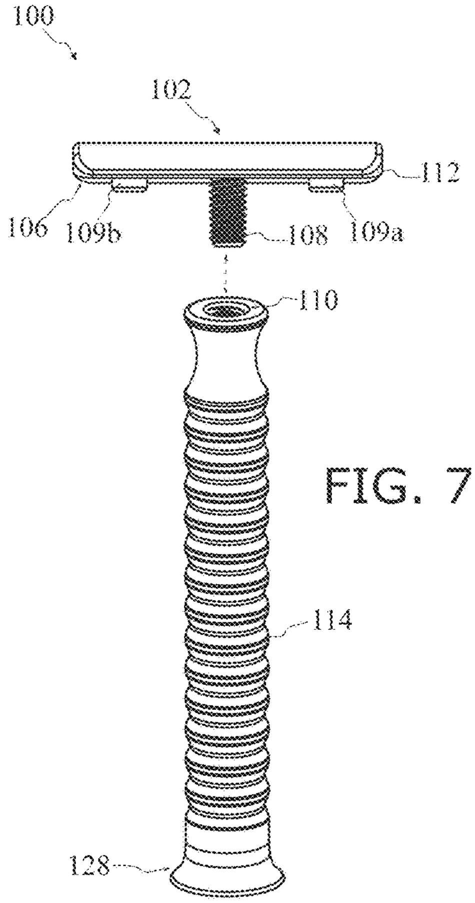
FIG. 7 is an exploded view of a shaving implement according to an alternative embodiment of the present disclosure.
Figure 8:
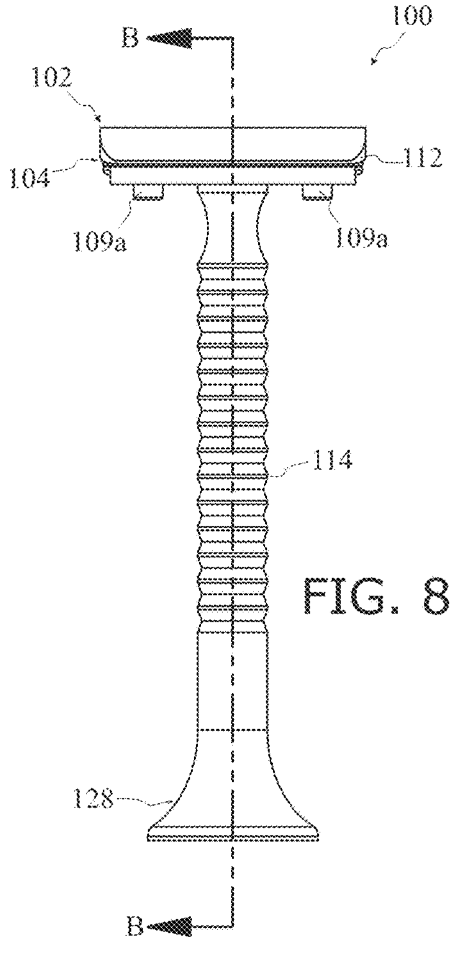
FIG. 8 is a side view of a shaving implement according to an alternative embodiment of the present disclosure.

In addition, FIG. 1 illustrates a support structure 118 that may comprise a second aperture **124*a* configured to receive the elongated coupling member 108 of the head 102. Also illustrated are two additional, optional apertures 124*b*, 124*c* that may be present to receive additional fasteners 109*a*, 109*b* (as shown in FIGS. 7 and 8), for securing the support structure 118 to the blade 112 and the handle 114. The exact number of apertures and fasteners is not definitive and may be any conceivable number capable of coupling and securing the head 102 to the blade 112. The length of the support structure 118 may be substantially similar to the length of the head 102, relative to the horizontal reference plane A, in a first direction towards the first side 104 of the head 102 and a second direction towards the second side 106 of the head 102. The width of the support structure 118 may be less than or equal to the width of the head 102, but cannot be greater than the width of the blade 112**, relative to the reference plane A.

The support structure 118 is configured to substantially deform the blade 112 when a force, clamping or otherwise, is applied to the support structure 118. The angle of deformation must be different on both the first side 115*a* of the blade 112 and the second side 115*b* of the blade, but either the first side 115*a* or the second side 115*b* of the blade may not experience any deformation at all and stay substantially flat relative to the reference plane A. Moreover, the force may be applied relative to a second reference plane B and may be applied through rotation of the handle 114 by a user (not shown), coupling the elongated coupling member 108 to a central aperture 110 in the handle 114.

The first planar surface 117 of the blade 112 may be identified as the surface contactingly engaged with the head 102, while the bottom surface of the blade may be identified as the surface contactingly engaged with the support structure 118. Both the first planar surface 117 and the bottom surface of the blade 112 will be in contact with the head 102 and the support structure 118, respectively, upon the application of force on the support structure 118 by the handle by the user.

Further shown in FIG. 1, is a pre-formed angular deformation 120*a*, 120*b* of the support structure 118. This optional deformation may be present to assist in deforming and securing the blade 112 to the head 102. The angle of deformation of the blade 112 may be further exaggerated by a first pre-formed angular deformation 120*a* of a first side 122*a* of the support structure 118 and a second pre-formed angular deformation 120*b* of a second side 122*b* of the support structure 118. The angle of deformation for the first side 122*a* and second side 122*b* of the support structure 118, may be substantially the same or distinct. In some embodiments, there may be no angle of deformation for either side 122*a*, 122*b*. In other embodiments, the angle of deformation may cause either side 122*a*, 122*b* of the support structure 118 to no longer abut the blade 112.

In some embodiments, the support structure 118 comprises an elongated planar surface 119 that is substantially the same as the first planar surface 117 of the blade 112.

In other embodiments, the support structure 118 may comprise an elongated planar surface that may extend past the first side 115*a* and second side 115*b* of the blade 112. In these alternative embodiments the first and second angular deformations 120*a*, 120*b* of the first and second sides 122*a*, 122*b* of the support structure 118 may not be present.

In some embodiments, the support structure is limited to an area no larger than the width of the first planar surface 117 of the blade 112.

In yet another embodiment, the support structure 118 is configured to extend a predefined distance from an edge of the first and second sides 104, 106 of the head 102 and may be configured to contactingly engage the bottom surface of the blade 112 at the first and second sides 115*a*, 115*b* of the blade 112, and further configured to compress the blade 112 between the support structure 118 and the head 102.

As illustrated in FIG. 1, the handle 114 (also referred to herein as a "gripping member"), may be matingly coupled to the head 102 via the elongated coupling member 108 and may be configured to contactingly engage the support structure 118. In some embodiments, an upward force directed by a user (not shown) may compress the blade 112 against the head 102 by compressing the support structure 118 against the blade 112. This compressive force may cause deformation of the first and second sides 115*a*, 115*b* of the blade 112 and in alternative embodiments, the degree of compressive force may assist in determining a resting angle of the blade. Wherein, a more compressive force along the second reference plane B may result in greater angular deformation of the blade 112 as the blade 112 is compressed against the head 102.

In yet another embodiment, the angle of deformation of the blade 112 may reach a first resting position wherein the blade is configured to be at a first angle of deformation on the first side 115*a* and a second angle of deformation on the second side 115*b*; wherein application of additional compression results in a second resting position, wherein the blade 112 is further deformed on its first and second sides 115*a*, 115*b* respectively.

In some embodiments, the elongated member 108 of the head 102 may be configured to allow for multiple resting and engagement positions, thereby allowing a user to determine the angle of deformation desired for a shaving session. This may be achieved by increasing or decreasing the compression force of the support structure 118 and blade 112 against the head 102 of the shaving implement 100. It is conceivable that the increase and decrease of the compression force may be achieved through rotation of the handle 114, or through a compressing or pulling motion exerted by the user on the handle. The means by which the blade is deformed against the head are not limited and other means may be available to perform this action.

An increased angle of deformation may result in a more aggressive shaving experiences and a user may decide the angle of deformation desired for shaving.

Figure 2:
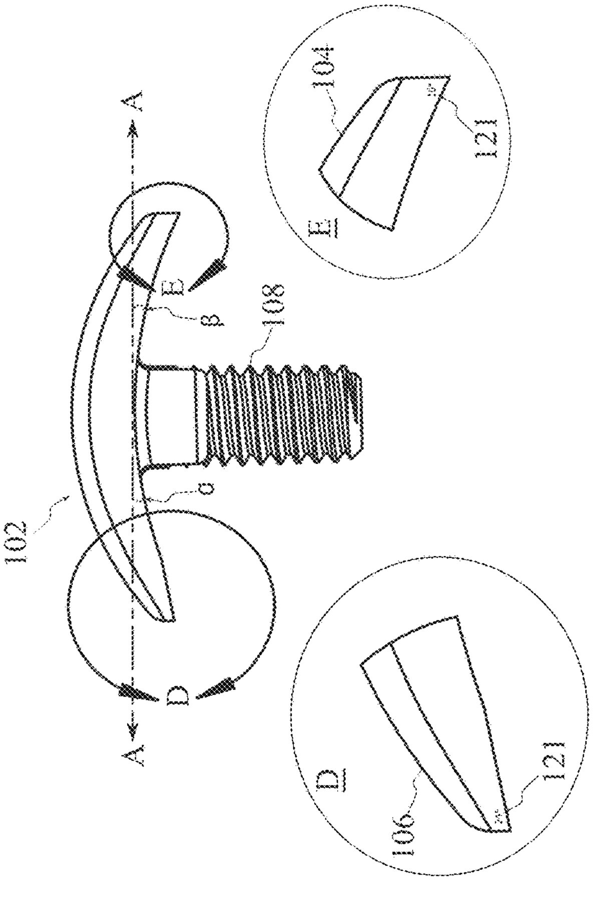
FIG. 2 is magnified view of a first and second side of a head.

FIG. 2 illustrates a magnified view of the first side 104 and second side 106 of a head 102. In some embodiments the head 102 may be interchangeable with one or more heads 102, wherein each head 102 may comprise sides 104, 106 having various angles of deformation. Each head 102 may be optionally engraved with an indicator(s) 121 corresponding to one or more angles of deformation or orientation to provide a user with precise, identifiable shaving angles for each side 104, 106 of the head 102. Other indicators 121 may be used to convey the angle of deformation of the blade 112, or no indicators 121 may be present. As further shown in FIG. 2, magnification E of the first side 104 illustrates a sharper angle of deformation of the head 102 relative to the second magnification D of the second side 106, which illustrates an angle of deformation more parallel to the reference plane A (see FIG. 2). Moreover, FIG. 2 illustrates that the first side 104 and second side 106 of the head 102 may be integral, sharing borders and surfaces.

Figure 3:
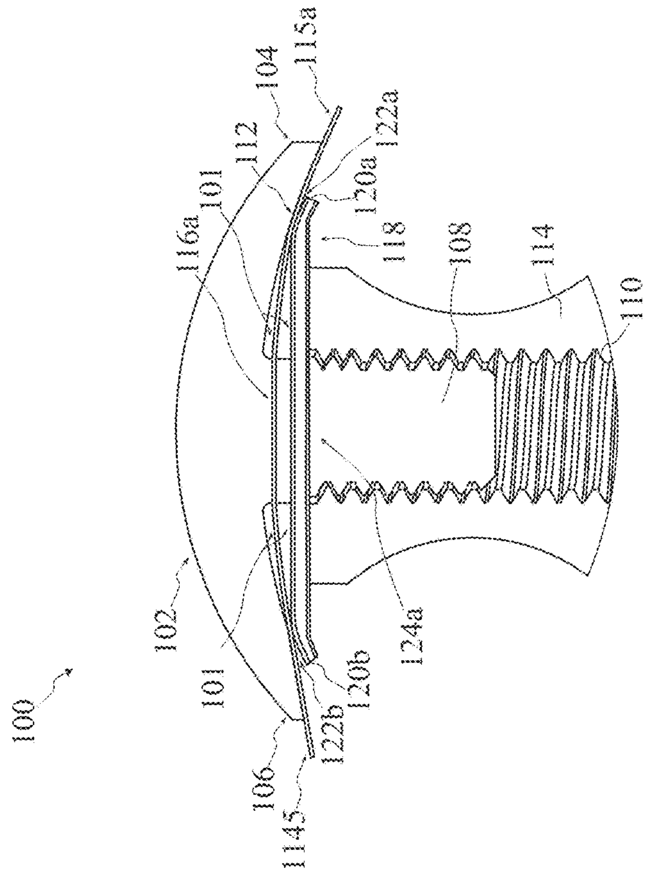
FIG. 3 is a dissected view of a head.

Further illustrated in FIG. 2 is the elongated member 108 of the head 102, wherein the present embodiment identifies a threaded surface configured to matingly engage with the handle 114 (see FIG. 3). The surface of the elongated member 108 adjacent the bottom surface (not shown) of the head 102 may be substantially smooth, to engage with the blade 112 and the support structure 118. In some embodiments, the threading may be present throughout the entire length of the elongated member 108, including the surface adjacent the head 102. In yet another embodiment, there may be no threading or limited threading of the elongated member 108.

FIG. 3 shows a dissected view of the shaving implement 100 in an engaged position. In the engaged position the handle 114 is matingly coupled to the head 102 of the shaving implement 100. The coupling of the head 102 and the handle 114 causing the support structure 118 to compress against the blade 112 and the blade 112 to compress against the head 102. The compression of the blade 112 against the head 102 by the support structure 118 causing a first angle of deformation to form on the first side 115*a* of the blade 112 and a second angle of deformation to form on the second side 115*b* of the blade 112, wherein the first and second angles of deformation are distinct and never equal. In the present embodiment the compression of the support structure 118 provides an upward force towards the head and creates a plurality of gaps 101 between the blade and the support structure 118 and the blade 112 and the head 102. These gaps 101 may diffuse pressure caused by application of the blade against a surface, such as a users skin, and allow for flexibility of the blade during use.

In some embodiments, there may be no gaps 101 between the blade 112 and the head 102. The support structure 118 may cause the blade 112 to abut the bottom surface (not shown) of the head 102. In other embodiments, the upper surface and bottom surface of the blade 112 may abut the bottom surface of the head 102 and the planar surface 119 (see FIG. 1) of the support structure 118.

Figure 4:
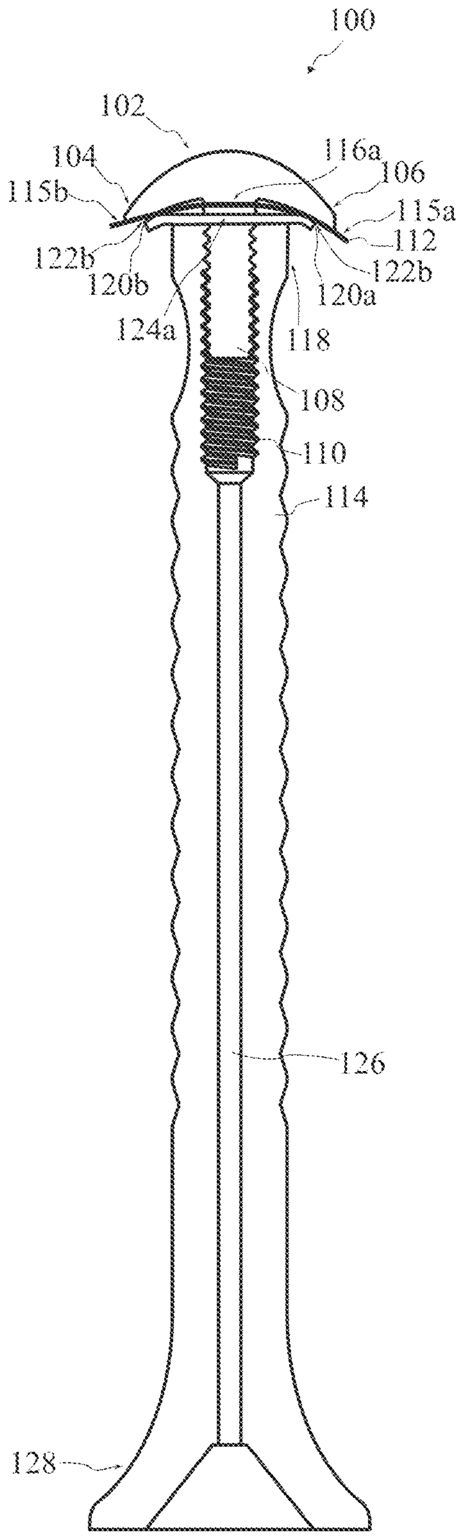
FIG. 4 is a dissected view of a shaving implement according to an embodiment of the present disclosure.

FIG. 4 is a dissected view of a shaving implement 100 in an engaged configuration, according to an embodiment of the present disclosure and further illustrating a hollow chamber 126 of the handle 114. In this embodiment the hollow chamber 126 extends distally from a bottom of the aperture 110 of the handle 114. In some embodiments the hollow chamber 126 may optionally contain a weighted element for increasing the weight and balance of the handle 114. In other configurations the hollow chamber 126 may comprise a liquid therein.

In some embodiments the hollow chamber 126 may optionally terminate in a base portion 128 of the handle 114.

In yet other embodiments, the hollow chamber 126 may not be present and the handle 114 may comprise an aperture with a length configured to receive the entire length of the elongated member 108.

Figure 5:
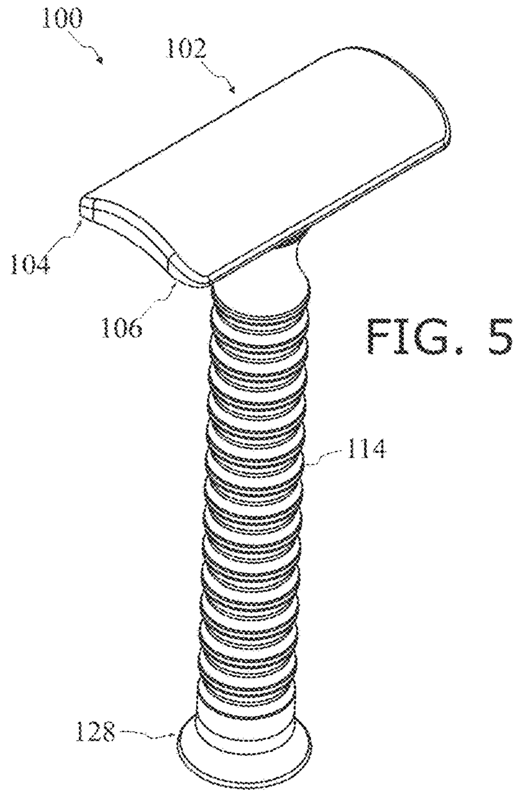
FIG. 5 is an isometric view of a shaving implement according to an alternative embodiment of the present disclosure.
Figure 6:
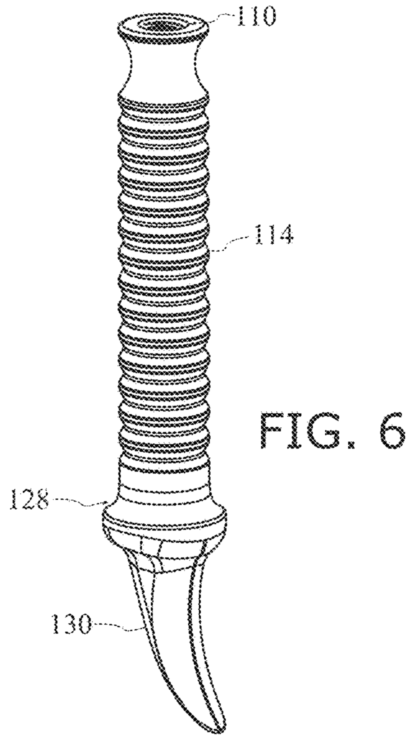
FIG. 6 is a side view of a gripping member of a shaving implement having an elongated tooth, according to an embodiment of the present disclosure.

In some embodiments the base portion 128 may be substantially flat on a bottom surface (not shown) and configured to support the shaving implement 100 in a substantially vertical configuration on a contact surface. The base portion 128 may be but is not limited to a frusto-conical shape. The base portion 128 may be further configured to rotate about a central axis to allow for adjustment of the shaving implement 100 about the central axis, when in a resting, vertical position. The base portion 128 may further comprise a hollowed core for engaging a resting apparatus (not shown). The base portion 128 may further comprise a weighted core, distinct from the hollow chamber 126 of the handle 114 and configured to balance the shaving implement 100 when in a vertical position. FIGS. 5 to 7 show the shaving implement 100 of the present disclosure comprising various base portions 128. In FIG. 5, the base portion 128 comprises a circular bottom portion configured to engage with a surface and a cylindrical upper portion configured to couple to the handle 114. In FIG. 6 the base portion comprises a frusto-conical upper portion and an elongated toothed bottom 130 portion configured to matingly engage with a receiving member (not shown). Other applications for the toothed bottom portion 130 may include but are not limited to storage and/or gripping of blades and a blade-sharpening apparatus for increasing the life and quality of the razor blade 112. FIG. 7 illustrates a shaving implement 100 comprising a base portion 128 having a frusto-conically shaped bottom portion terminating with a circular base of a pre-determined length and cylindrical upper portion coupled to the handle 114. FIG. 8 illustrated a base portion 128 having a similar frusto-conical dimension but with elongated upper and bottom portions of the base. The upper and bottom portions are further distinguished by a medial line configured to separate the base portion 128 into two distinct halves. Further illustrated in FIGS. 5 to 8 is a patterned gripping portion of the handle 114. The gripping portion of the handle 114 may be comprised of any material and may be adhered or otherwise coupled to the handle 114. Alternatively, the gripping portion may be integrated with the handle 114 or otherwise formed into the handle 114.

Figure 9:
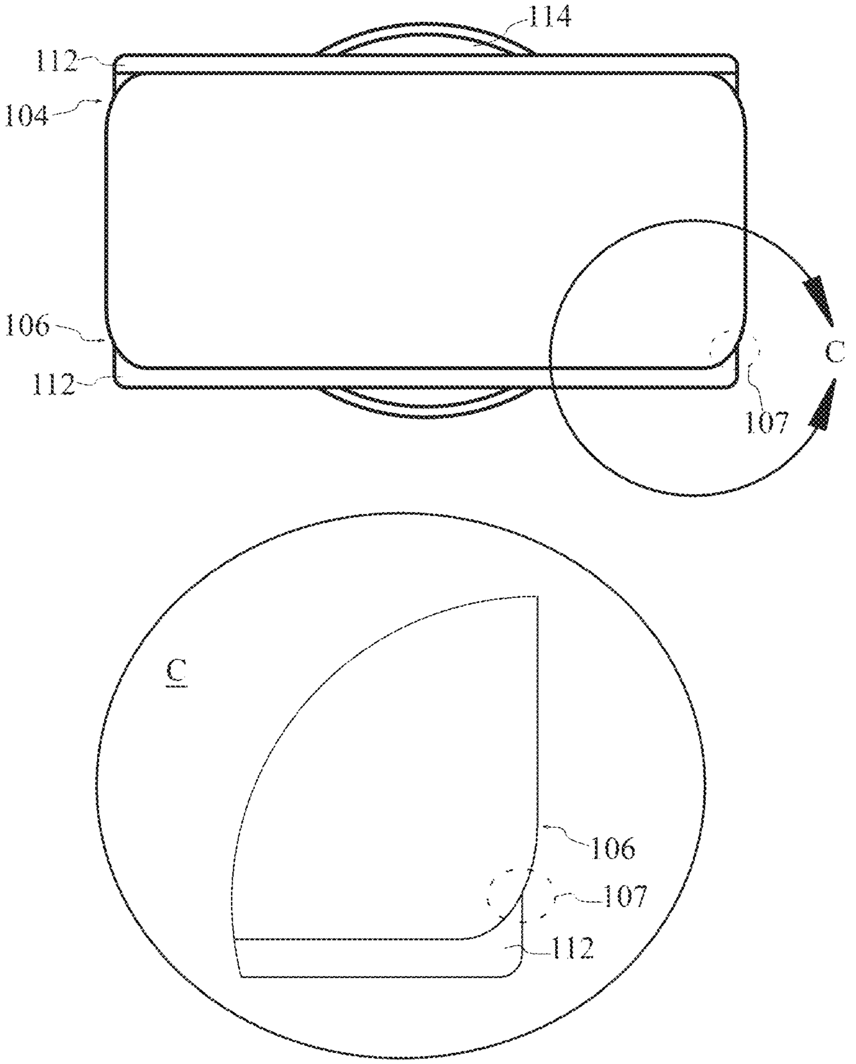
FIG. 9 is a magnified view of a portion of a head according to an embodiment of the present disclosure.

FIG. 9 shows a magnified C top view of a curved edge 107 (also referred to as "rounded edge") of the head 102 according to an embodiment of the present disclosure. As illustrated, the head may be configured to have a pre-defined width extending in a first direction from the first side 104 of the head 102 to the second side 106 of the head 102 and be of a width less than the width of the razor blade 112 extending from its first side 115*a* to its second side 115*b*. This configuration allows for greater visibility of the blade 112 for a user in various perspectives. Additionally, the curved edge 107 may be present on both sides 104, 106 of the head 102 and in all four corners as shown in the magnification C. To further aid in visibility of the blade 112, the curved edge 107 may be configured to expose a pre-defined length of the blade 112 along an outer edge towards the first planar surface 117 (not shown) of the blade 112.

FIG. 10 is a top view of the head 102 according to an embodiment of the present disclosure further identifying the reference plane A upon which all individual components (102, 112, 118, 114) are oriented during assembly and disassembly of the shaving implement 100.

FIG. 11 is a top view of a blade 112 according to an embodiment of the present disclosure and illustrates orientation of the blade 112 along the reference plane A for assembly.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A shaving implement, comprising:

a blade comprising a first cutting edge, and a second cutting edge opposite the first cutting edge;

a head operatively coupled to the blade and comprising:

a first side having curved edges and a first angular orientation relative to a horizontal reference plane following a first planar surface of the blade, and a second side having curved edges and a second angular orientation greater than the first angular orientation in relation to the horizontal reference plane;

a support structure operatively coupled to the head and the blade, the support structure comprising:

a first side configured to terminate a predefined distance from the first side of the head, and a second side opposite the first side and configured to terminate a predefined distance from the second side of the head, wherein the support structure contactingly engages and compresses the blade against the head;

a gripping member matingly coupled to the head and comprising:

a body, and a base, wherein the base is configured to support the shaving implement in a substantially vertical orientation when resting on a surface, and coupling the gripping member to the head causes the support structure to compress against the blade deforming the first cutting edge and the second cutting edge of the blade to substantially match the first angular orientation and the second angular orientation of the head respectively.

2. The shaving implement of claim 1, wherein the first angular orientation exhibits an angle between zero (0) and ten (10) degrees with respect to the horizontal reference plane, and the second angular orientation exhibits an angle between one (1) and forty-five (45) degrees with respect to the horizontal reference plane.

3. The shaving implement of claim 1, wherein the first angular orientation exhibits an angle of ten (10) degrees with respect to the horizontal reference plane.

4. The shaving implement of claim 1, wherein the second angular orientation exhibits an angle of no more than twenty-four (24) degrees with respect to the horizontal reference plane.

5. The shaving implement of claim 1, wherein the first angular orientation is substantially flat relative to the horizontal reference plane such that the first side of the head does not deform the blade when compressed by the support structure.

6. The shaving implement of claim 1, wherein the first side having a first angular orientation relative to the horizontal reference plane, and the second side having a second angular orientation relative to the horizontal reference plane.

7. The shaving implement of claim 6, wherein the head further comprises at least one coupling member, and the gripping member further comprising an aperture configured to matingly receive the coupling member.

8. A shaving implement comprising:

a blade comprising a central aperture, a first cutting edge, and a second cutting edge opposite the first cutting edge;

a head operatively coupled to the blade, the head comprising an elongated coupling member, a first side having curved edges and a first angular orientation exhibiting an angle of at least ten (10) degrees relative to a horizontal reference plane following a first planar surface of the blade, a second side having curved edges and a second angular orientation greater than the first angular orientation relative to the horizontal reference plane, wherein the curved edges of the first side and of the second side are configured to substantially expose the first cutting edge and the second cutting edge of the blade respectively;

a support structure operatively coupled to the head and the blade, the support structure comprising a second planar surface, a first side terminating a predefined distance from the first side of the head, and a second side opposite the first side and terminating a predefined distance from the second side of the head, wherein the support structure is configured to contactingly engage and compress the blade against the head;

a gripping member matingly coupled to the head via the elongated coupling member, the gripping member comprising a body and a base, the base configured to support the shaving implement in a substantially vertical orientation when resting on a surface, wherein coupling the gripping member to the head causes the support structure to compress against the blade deforming the first cutting edge and the second cutting edge of the blade to substantially match the first angular orientation and the second angular orientation of the head respectively.

9. The shaving implement of claim 8, wherein the second angular orientation exhibits an angle of no more than twenty-four (24) degrees with respect to the horizontal reference plane.

10. The shaving implement of claim 8, wherein the second angular orientation exhibits an angle of no more than forty-five (45) degrees with respect to the horizontal reference plane.

11. The shaving implement of claim 8, wherein:

the head further comprises a plurality of fasteners, the blade further comprises a plurality of apertures configured to receive the plurality of fasteners, and the support structure further comprises a plurality of apertures configured to receive the plurality of fasteners.

12. A shaving system comprising:

a blade assembly comprising a blade with a first planar surface having a central aperture, a first cutting edge, and a second cutting edge located opposite the first cutting edge;

a head assembly operatively coupled to the blade assembly, the head assembly comprising an elongated coupling member, a first side comprising curved edges and a first angular orientation forming an angle of at least ten (10) degrees relative to a horizontal reference plane, a second side with curved edges and a second angular orientation greater than the first angular orientation relative to the horizontal reference plane, the curved edges of the first side and of the second side configured to substantially expose the first cutting edge and the second cutting edge of the blade, respectively;

a support structure assembly operatively coupled to the head assembly and the blade assembly, the support structure assembly comprising a second planar surface, a first side terminating a predefined distance from the first side of the head assembly, and a second side opposite the first side and terminating a predefined distance from the second side of the head assembly, the support structure assembly configured to contactingly engage and compress the blade against the head assembly;

a gripping member assembly matingly coupled to the head assembly via the elongated coupling member, the gripping member assembly includes a body and a base, with the base configured to support the shaving system in a substantially vertical orientation when resting on a surface, the coupling of the gripping member assembly to the head assembly causes the support structure assembly to compress against the blade, deforming the first cutting edge and the second cutting edge of the blade to substantially match the first angular orientation and the second angular orientation of the head assembly, respectively.

13. The shaving system of claim 12, wherein coupling the support structure assembly to the head assembly causes a plurality of gaps to form between the first planar surface of the blade assembly and a bottom surface of the head assembly and a bottom surface of the blade assembly and the second planar surface of the support structure assembly, the plurality of gaps configured to allow flexibility of the blade assembly during operation.

14. The shaving system of claim 12, wherein coupling the support structure assembly to the head assembly causes the first planar surface of the blade assembly to abut a bottom surface of the head assembly and a bottom surface of the blade assembly to abut the second planar surface of the support structure assembly.

* * * * *